United States Patent
Phillips et al.

(10) Patent No.: US 6,581,705 B2
(45) Date of Patent: Jun. 24, 2003

(54) METHOD FOR STARTING AN ENGINE IN A PARALLEL HYBRID ELECTRIC VEHICLE

(75) Inventors: Anthony Mark Phillips, Northville, MI (US); Michael W. Degner, Farmington Hills, MI (US); Miroslava Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/681,966

(22) Filed: Jun. 29, 2001

(65) Prior Publication Data

US 2003/0001390 A1 Jan. 2, 2003

(51) Int. Cl.$^7$ ................................................ B60K 1/00
(52) U.S. Cl. .................... 180/65.2; 180/65.3; 180/65.4; 701/22
(58) Field of Search ................ 180/65.2, 65.3, 180/65.4, 65.6, 65.7; 475/5; 130/65.3; 701/22, 36

(56) References Cited

U.S. PATENT DOCUMENTS

| | | | | |
|---|---|---|---|---|
| 4,335,429 A | * | 6/1982 | Kawakatsu | 180/65.2 |
| 5,343,970 A | | 9/1994 | Severinsky | |
| 5,823,280 A | * | 10/1998 | Lateur et al. | 180/65.2 |
| 5,865,263 A | | 2/1999 | Yamaguchi et al. | |
| 5,909,094 A | * | 6/1999 | Yamada et al. | 701/22 |
| 5,984,033 A | * | 11/1999 | Tamagawa et al. | 180/65.2 |
| 6,007,443 A | * | 12/1999 | Onimaru et al. | 180/65.2 |
| 6,026,921 A | | 2/2000 | Aoyama et al. | |
| 6,054,776 A | | 4/2000 | Sumi | |
| 6,054,844 A | * | 4/2000 | Frank | 180/65.2 |
| 6,067,801 A | * | 5/2000 | Harada et al. | 60/705 |
| 6,090,007 A | * | 7/2000 | Nakajima et al. | 477/46 |
| 6,110,066 A | * | 8/2000 | Nedungadi et al. | 475/5 |
| 6,116,363 A | * | 9/2000 | Frank | 180/65.2 |
| 6,196,344 B1 | * | 3/2001 | Tamor | 180/65.4 |
| 6,203,468 B1 | * | 3/2001 | Nitta et al. | 477/5 |
| 6,209,672 B1 | * | 4/2001 | Severinsky | 180/65.2 |
| 6,233,508 B1 | * | 5/2001 | Deguchi et al. | 701/22 |
| 6,307,277 B1 | * | 10/2001 | Tamai et al. | 180/65.2 |
| 6,330,498 B2 | * | 12/2001 | Tamagawa et al. | 701/22 |
| 6,453,222 B1 | * | 9/2002 | Lasson et al. | 701/22 |
| 6,470,983 B1 | * | 10/2002 | Amano et al. | 180/65.2 |

* cited by examiner

Primary Examiner—Brian L. Johnson
Assistant Examiner—Hau Phan
(74) Attorney, Agent, or Firm—Brooks & Kushman P.C.; Carlos L. Hanze

(57) ABSTRACT

The invention provides a strategy to start a parallel HEV powertrain engine while maintaining a smooth vehicle response to driver demand using the motor while simultaneously closing an engine disconnect clutch. In the preferred embodiment, the strategy starts an engine (based on, for example, driver demand), closes the disconnect clutch, commands a desired motor/generator speed, fuels the engine, calculates a desired engine torque and gradually reduces actual motor/generator torque while proportionally increasing actual engine torque until motor/generator torque is zero while maintaining vehicle velocity using, for example, a proportional plus integral controller. The prediction of a desired motor/generator speed can be: a trajectory comparison based on present and past vehicle velocity and acceleration or on vehicle accelerator position, or a determination of whether the vehicle is in speed control mode. The system can also add additional strategies such as a termination strategy if a vehicle brake is applied.

32 Claims, 4 Drawing Sheets

METHOD FOR STARTING AN ENGINE IN A PARALLEL HYBRID ELECTRIC VEHICLE

BACKGROUND OF INVENTION

1. Field of Invention

The present invention relates generally to a hybrid electric vehicle (HEV), and specifically to a strategy to start an engine in an HEV with minimal torque disturbance to the powertrain.

2. Discussion of the Prior Art

The need to reduce fossil fuel consumption and pollutants from automobiles and other vehicles powered by internal combustion engines (ICEs) is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called hybrid electric vehicles (HEV's). See generally, U.S. Pat. No. 5,343,970 to Severinsky.

The HEV has been described in a variety of configurations. Some HEV patents disclose systems where an operator is required to select between electric and internal combustion operation. In other configurations the electric motor drives one set of wheels and the ICE drives a different set.

Other, more useful, configurations have developed. A series hybrid electric vehicle (SHEV) is a vehicle with an engine (most typically an ICE), which powers a generator. The generator, in turn, provides electricity for a battery and motor coupled to the drive wheels of the vehicle. There is no mechanical connection between the engine and the drive wheels. A parallel hybrid electrical vehicle (PHEV) is a vehicle with an engine (most typically an ICE), battery, and electric motor combined to provide torque to power the wheels of the vehicle.

A parallel/series hybrid electric vehicle (PSHEV) has characteristics of both the PHEV and the SHEV. The PSHEV is also known as a torque (or power) splitting powertrain configuration. Here, the torque output of the engine is given in part to the drive wheels and in part to an electrical generator. The generator powers a battery and motor that also provide torque output. In this configuration, torque output can come from either source or both simultaneously. The vehicle braking system can even deliver torque to drive the generator to produce charge to the battery (regenerative braking).

The desirability of combining the ICE with an electric motor is clear. The ICE's fuel consumption and pollutants are reduced with no appreciable loss of performance or vehicle range. A major benefit of parallel HEV configurations is that the engine can be turned off during periods of low or no power demand from the driver (e.g., waiting for a traffic light). This improves fuel economy by eliminating wasted fuel used during idle conditions. The motor can then propel the vehicle under conditions of low power demand. In some configurations, the engine can be disconnected from the motor and powertrain when it is not running by opening a disconnect clutch. As power demand increases, the engine can be restarted and reconnected to provide the requested torque.

Developing a strategy to start an HEV engine and transfer primary torque production of the powertrain from the motor to the engine with minimal torque disturbance is needed for successful implementation of a parallel HEV. If the engine is disconnected from the powertrain, starting the engine would involve maintaining the vehicle's response to the driver's demand using the motor while simultaneously closing a clutch that connects the engine to the powertrain (disconnect clutch) and start running the engine. Torque supply to the powertrain should be transferred from the motor to the engine smoothly in order to avoid any disturbance to the driver.

Strategies to turn on an HEV's engine are known in the prior art. See generally, U.S. Pat. No. 6,054,776 to Sumi; U.S. Pat. No. 6,026,921 to Aoyama et al.; and U.S. Pat. No. 5,865,263 to Yamaguchi, et al. Unfortunately, no strategy is known to start a parallel HEV engine while maintaining a smooth vehicle response to driver demand using the motor while simultaneously closing a clutch that connects the engine to the powertrain (disconnect clutch).

SUMMARY OF INVENTION

Accordingly, the present invention provides a strategy to start a parallel HEV engine while maintaining a smooth vehicle response to driver demand using the motor while simultaneously closing a clutch that connects the engine to the powertrain. In the preferred embodiment, the HEV powertrain has an engine, a motor/generator, a power transfer unit (such as an automatic transmission, planetary gear set, or an electronic converterless transmission), and an engine disconnect clutch.

The strategy starts running the engine (based on, for example, driver demand), connects the disconnect clutch to the powertrain, fuels the engine, and predicts a desired motor/generator speed. Next the strategy calculates a desired engine torque. And finally, the strategy gradually reduces actual motor/generator torque while proportionally increasing actual engine torque until motor/generator torque is zero while maintaining vehicle velocity.

The prediction of a desired motor/generator speed can be a trajectory comparison based on vehicle velocity and acceleration at a present time and at some past time or on a vehicle accelerator position. Predicting the desired motor/generator speed can also include a determination of whether the vehicle is in speed following control mode.

The system can also add additional strategies such as a termination the strategy if a vehicle brake is applied.

The gradual reduction of actual motor/generator torque occurs by proportionally increasing actual engine torque until motor/generator torque is zero while maintaining vehicle velocity using, for example, a proportional plus integral controller.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

The present invention generally relates to hybrid electric vehicles (HEVs). Although the preferred embodiment described is for a parallel HEV, the invention could be applied to any vehicle using a motor and an engine as the drive source having an engine disconnect clutch.

Figure 1:
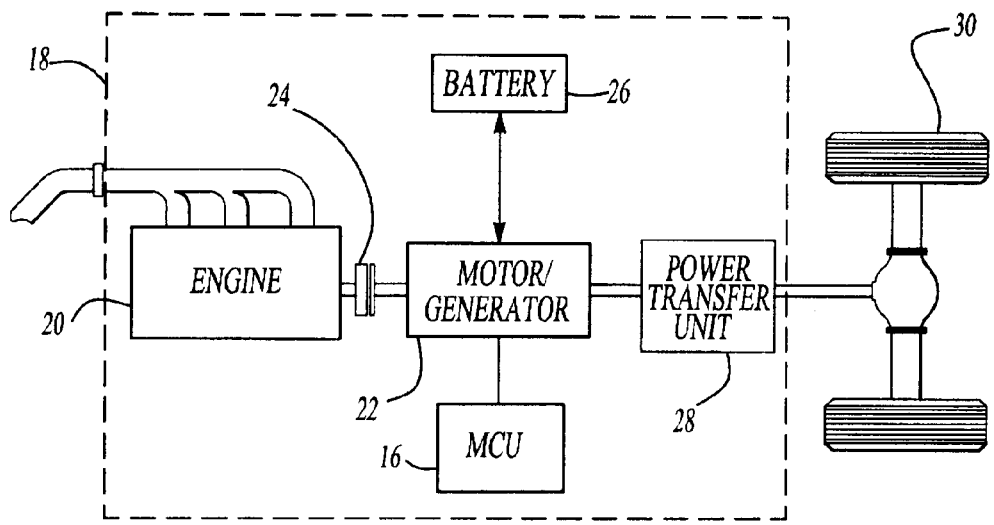
FIG. 1 shows a general parallel hybrid electric vehicle configuration with an engine disconnect clutch.

FIG. 1 shows general components of a parallel HEV powertrain with an engine disconnect clutch. An engine 20, is linked to a motor/generator 22, via a disconnect clutch 24. The powertrain has a vehicle system controller (VSC) 18, and the motor/generator 22 has an additional motor control unit and inverter (MCU) 16. A battery 26 connects to the motor/generator 22 to allow the flow of electrical current to and from the two components. The motor/generator 22 is connected to a powertrain power transfer unit 28 (such as an automatic transmission, a planetary gear set (power-split), or an electronic converterless transmission), which is connected to the vehicle's wheels 30. Thus, torque and energy flow from the engine 20 and motor/generator 22 through the power transfer unit 28 to the wheels 30.

In this configuration, both the engine 20 and the motor/generator 22 can be directly coupled to the wheels 30, so that both power sources can independently provide torque to the vehicle powertrain. The configuration shown in FIG. 1 employs the disconnect clutch 24 between the engine 20 and the motor/generator 22 to allow a temporary disconnection of the engine 20 from the motor/generator 22 and the wheels 30. The motor, in addition to propelling the vehicle, can also be operated as a generator for use in charging the battery 26 using the engine 20 or through regenerative braking.

Figure 2A:
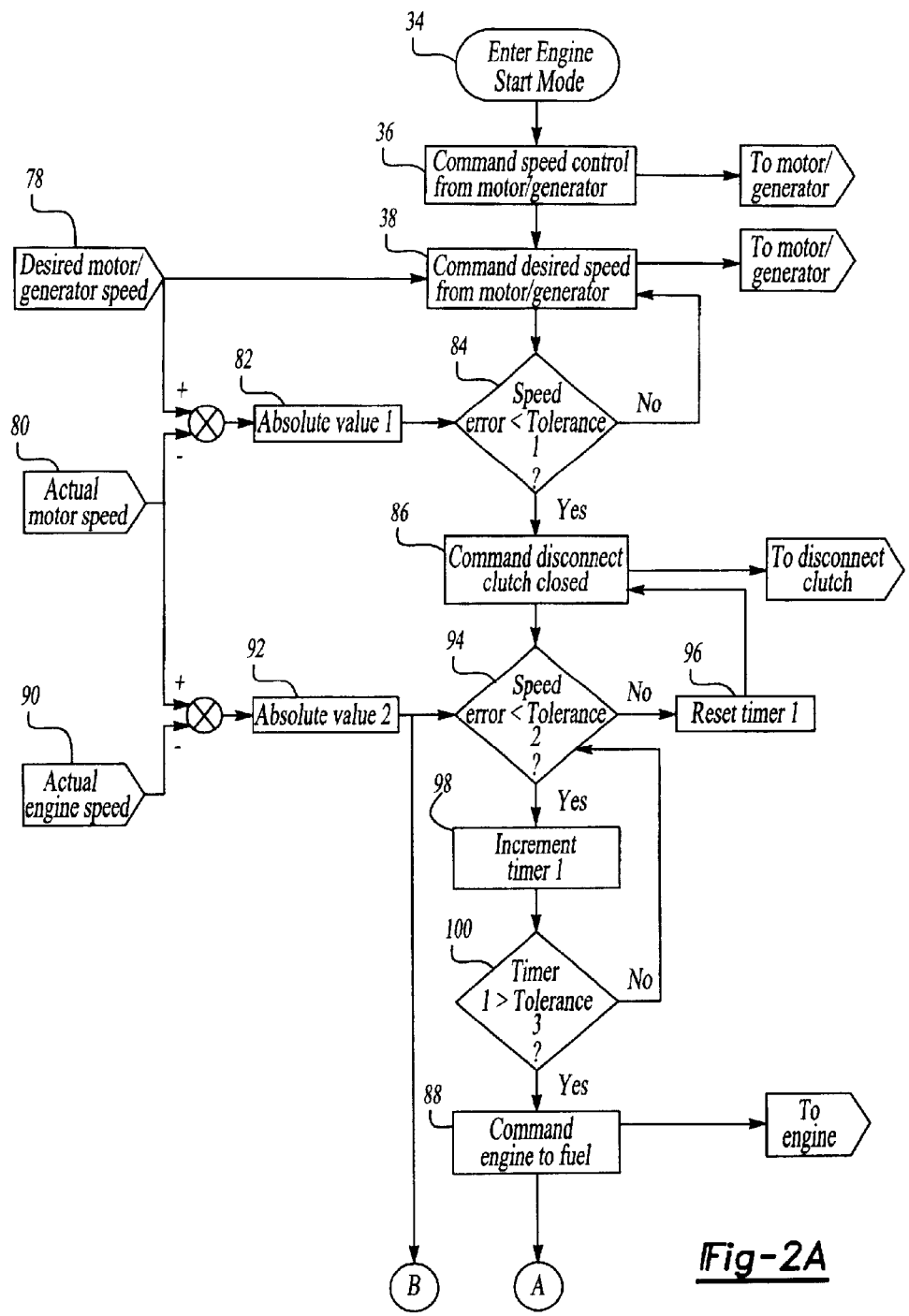
FIG. 2 shows the strategy of the present invention to start running the engine and smoothly reconnect the engine to the vehicle powertrain.
Figure 2B:
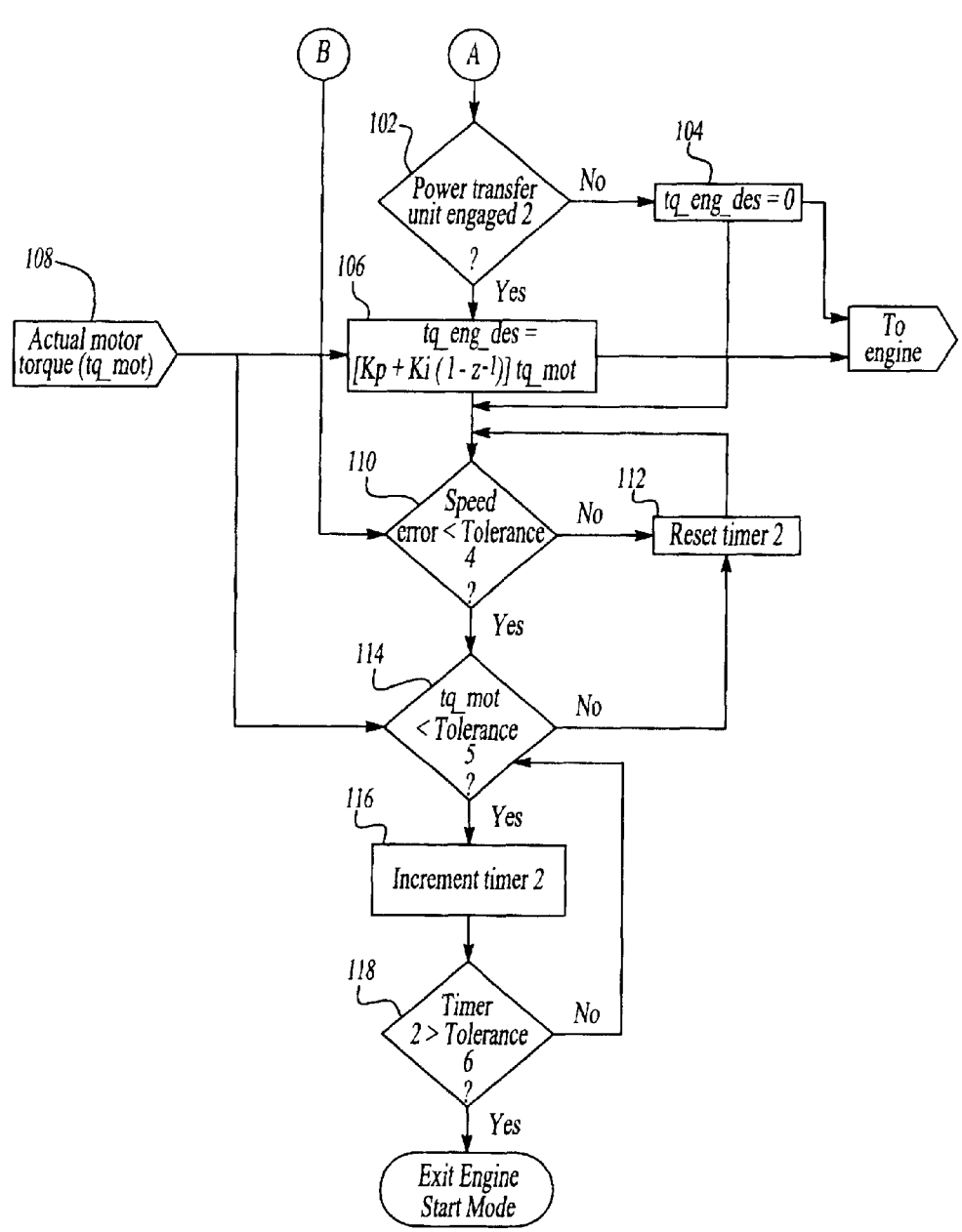

The present invention is a strategy to start a parallel HEV engine, while maintaining a smooth vehicle response to driver demand, using the motor/generator and simultaneously closing a clutch that connects the engine to the powertrain. The preferred embodiment of the strategy of the present invention is illustrated in FIG. 2. It is noteworthy at the outset that the strategy can be configured to terminate at any point if a vehicle brake is applied or some other input changes value (not shown).

The starting strategy of the present invention begins with a command from the vehicle system controller (VSC) 18 to enter an engine start mode at Step 34. Initially, the motor/generator 22 is commanded to run in speed following control mode in Step 36 (as opposed to torque following mode). During speed following control mode, the motor/generator applies whatever torque is necessary to achieve the desired speed set point. On the other hand, in torque following mode, the motor/generator tries to achieve the desired torque set point, allowing the speed to change. The motor/generator 22 remains in speed following control mode for the entire starting event. The desired angular speed command of the motor/generator 22 is input to the system at Step 38. A desired motor/generator speed 78 is based on the overall vehicle operating status and driver demand, and may either be a constant value or a trajectory based on vehicle velocity and acceleration at a present time and at some past time.

Figure 3:
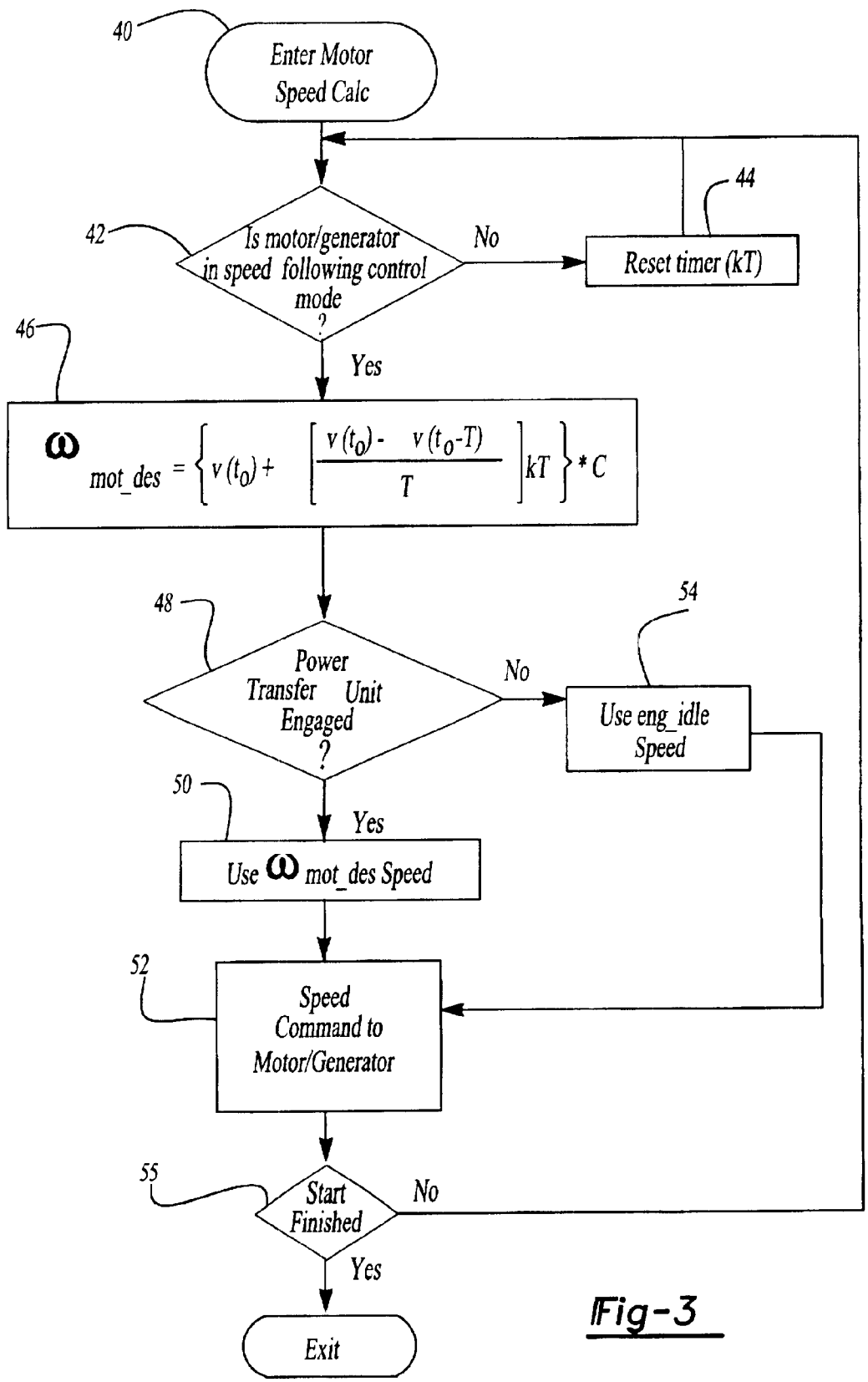
FIG. 3 shows a strategy for calculating the desired motor/generator speed.

A strategy for calculating the desired motor/generator 22 speed is illustrated in FIG. 3. If the power transfer unit 28 is not engaged (implying the driver is currently commanding no motive torque), the desired speed is set to the desired engine 20 idle speed. This can either be calibrated or received as an input signal from an engine controller within the VSC 18. If the power transfer unit 28 is engaged, the desired motor/generator 22 angular speed ($\omega_{mot\_des}$) is calculated according to:

$$\omega_{mot\_des}=[v(t_0)+((v(t_0)-v(t_0-T))/T)*kT]*C.$$

In this formula: "$v(t_0)$" is the vehicle speed when the engine start mode 34 is entered (i.e., at time="$t_0$"); "T" is a sample time between measurements of vehicle speed, "k" is a number of measurement sample intervals since $t_0$ and "C" is the kinematic conversion factor from vehicle speed to motor/generator angular speed and can include wheel radius, final drive ratio, and gear ratio. The constant "C" converts linear vehicle speed at the wheels to angular motor/generator speed. This method effectively uses the vehicle's velocity and acceleration at the beginning of the engine start event to estimate the vehicle's velocity at some future time $(t_0)+kT$. This basic calculation could be further enhanced to vary the desired motor/generator 22 angular speed based on, for example, accelerator or brake input from the driver.

FIG. 3 shows the specific strategy of the preferred embodiment for the motor/generator 22 speed calculation. The strategy enters a motor/generator speed calculation at Step 40 and determines whether the motor/generator 22 is in speed following control mode at Step 42. If it is not, a controller timer (not shown) is reset at Step 44 and returns the strategy to Step 40 to start over.

If the motor/generator 22 is in speed following control mode at Step 42, the $\omega_{mot\_des}$ is calculated as described above at Step 46. Once $\omega_{mot\_des}$ is calculated the strategy makes a first determination of whether the power transfer unit 28 (such as a transmission) is engaged at Step 48. If the power transfer unit is engaged, the calculated $\omega_{mot\_des}$ is used at Step 50 and sent by the VSC 18 to the motor/generator 22 at Step 52. If the power transfer unit is not engaged, an engine idle speed is used at Step 54, and sent by the VSC 18 to the motor/generator 22 at Step 52. Once the speed command is sent to the motor/generator 22 at Step 52, the strategy loops back to Step 42 until the start is finished at Step 55 where the strategy ends. The loop back is needed for the speed command to be continually updated throughout the start event.

An alternative algorithm for calculating the desired speed trajectory shown in FIG. 3 could instead utilize a map from accelerator position to desired vehicle speed, which could then be translated to desired motor/generator speed. As stated above for any implementation, brake position can still be monitored for any changes so that the overall strategy can be aborted if the brake is applied.

Figure 4:
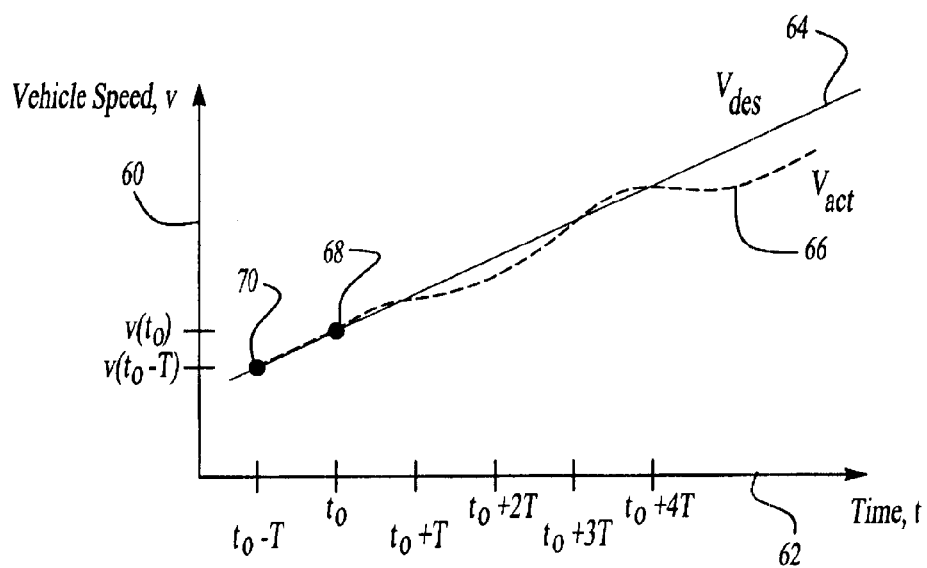
FIG. 4 shows vehicle speed over time for desired and actual vehicle speed.

FIG. 4 shows a vehicle speed (velocity) 60 (Y-axis) over time 62 (X-axis) for desired vehicle speed 64 and actual vehicle speed 66. Desired vehicle speed 64 can be calculated, by way of example only, using vehicle speed and acceleration at the beginning of the engine start event 68 and vehicle speed and acceleration at some past time 70 to estimate the vehicle's velocity at some future time.

Moving back to the general strategy of FIG. 2. After the command for desired motor/generator 22 speed is sent in Step 38, an actual motor/generator speed 80 is received from a vehicle sensor (not shown) and is compared to the desired motor/generator speed 78 at Step 82 to produce a speed error (Absolute value 1). The strategy then determines whether the Absolute value 1 of the motor/generator speed error of Step 82 falls below a first calibratable tolerance (Tolerance 1) at Step 84. If the speed error 82 is not below Tolerance 1 at Step 84, the strategy returns to Step 38. If the speed error 82 is below Tolerance 1 at Step 84, the strategy commands the disconnect clutch 24 to close at Step 86.

As the plates of the disconnect clutch 24 come together, the engine 20 speed will begin to increase to match the speed of the motor/generator 22. Since the motor/generator 22 is in speed following control mode, it will continue to apply whatever torque is necessary (within its capability) to maintain the desired speed, even while accelerating the additional load from the engine 20. Actual engine speed 90 is received from a vehicle sensor (not shown) and is compared to the actual motor/generator speed 80 at Step 92 to produce a slip speed error (Absolute value 2) as is known in the prior art. This allows actual engine speed 90 to be monitored as it approaches the actual motor/generator speed 80 at Step 94 (below).

The strategy of Step 94 then determines whether the Absolute value 2 of the slip speed error (or difference) of actual engine speed 90 and the actual motor/generator speed 80 falls below a second calibratable tolerance (Tolerance 2). If the speed error is not below Tolerance 2 at Step 94, the strategy resets Timer 1 at Step 96 and returns to Step 86. If the speed error is below Tolerance 2 at Step 94, the strategy commands the Timer 1 to be incremented at Step 98. Once the speed error between the two devices remains below the second calibratable tolerance (Tolerance 2) for a first calibratable amount of time (Tolerance 3) as indicated by Timer 1, a desired torque command can ultimately be sent to the engine 20. At Step 100, the strategy determines whether Timer 1 is greater than Tolerance 3. If it is not, the strategy returns to Step 94.

The next sequence of steps in the strategy transfer motive torque from the motor/generator 22 to the engine 20. If Timer 1 is greater than Tolerance 3 at Step 100, the strategy directs the VSC 18 to begin running the engine 22 by fueling the engine 22 at Step 88 based on its own separate starting algorithm.

Next, the strategy next makes a second determination whether the power transfer unit 28 is engaged at Step 102. This determines the amount of torque command to the engine 20. If the power transfer unit 28 is not engaged (indicating that the engine 20 should be started to idle), a torque command of 0 is sent to the engine at Step 104.

If the power transfer unit is engaged, (indicating the vehicle is being driven), the strategy attempts to minimize the powertrain disturbance caused during the torque shift from the motor/generator 22 to the engine 20. In general, the strategy achieves this by basing the desired torque command to the engine 20 on the actual torque that is being supplied by the motor/generator to maintain the desired velocity.

The implementation shown uses a second, or simple proportional plus integral (PI), controller, known in the prior art, to gradually reduce motor/generator 22 torque to zero by modifying (increasing) an engine 20 torque setpoint accordingly. Desired engine torque (tq_eng_des) is calculated at Step 106 using the PI controller as follows:

$$tq\_eng\_des\_ = tq\_[Kp+Ki(1-z^{-1})]tq\_mot.$$

where Kp and Ki are calibratable proportional and integral controller gains, respectively, and $z^{-1}$ is a one time step delay. An alternative control algorithm that could be used might involve a feed-forward calculation as follows:

$$tq\_eng\_des\_ = tq\_mot + [Kp+Ki(1-z^{-1})]tq\_mot.$$

In general, any other controller that drives motor/generator torque (tq_mot) to zero could be used in place of the PI controller. Actual motor/generator torque 108 can be received from a vehicle sensor (not shown) or estimated.

Under the influence of the PI controller, the engine 20 will begin to provide the increasing torque necessary to maintain the vehicle on the desired speed trajectory while the motor/generator 22 provides decreasing torque. The engine start strategy is considered desired speed (i.e., motor/generator 22 torque is zero). This condition is established by determining when the motor/generator 22 torque has remained below a third calibratable tolerance (Tolerance 5) and the speed error between the motor/generator 22 and the engine 20 has remained below a fourth calibratable tolerance (Tolerance 4) for a second calibratable amount of time (Tolerance 6). At this point, the engine has been started and is providing the necessary torque to propel the vehicle so the engine start mode is exited.

To reach this point specifically, the strategy makes a determination of whether the engine speed error is less than the Tolerance 4 at Step 110 based on the desired engine torque from Step 106 and the Absolute value 2 of the slip speed error of Step 92. If the error is greater than Tolerance 4, Timer 2 is reset at Step 112 and the strategy returns to Step 110 until the error is less than Tolerance 4. When this happens, the strategy makes a determination of whether the motor/generator 22 torque is less than Tolerance 5 at Step 114 based on actual motor/generator torque 108. If motor/generator 22 torque is not less than Tolerance 5, Timer 2 is again reset at Step 112 and the strategy returns to Step 110 until the engine 20 speed error is less than Tolerance 4.

While motor/generator 22 torque is less than Tolerance 5 at Step 114, the strategy commands the Timer 2 to be incremented at Step 116. Once the speed error and torque conditions (Steps 110 and 114) are continually met for a calibratable duration (Tolerance 6) as determined at Step 118, the engine is determined to be running and providing the full required torque to the powertrain. At this point, the engine has been successfully started and the routine is exited.

The above-described embodiment of the invention is provided purely for purposes of example. Many other variations, modifications, and applications of the invention may be made.

What is claimed is:

1. A system to start an engine in a vehicle, the system comprising:

a motor/generator;

a power transfer unit;

a vehicle powertrain connecting the engine, the motor/generator, and the power transfer unit;

a disconnect clutch disposed between the engine and the motor/generator for connecting the engine to, and disconnecting the engine from, the motor/generator; and a vehicle system controller, the vehicle system controller being configured to facilitate closing of the disconnect clutch to start engine rotation while facilitating operation of the motor/generator based on a desired motor/generator speed, the vehicle system controller being further configured to calculate a slip speed error, the slip speed error being the difference between an actual motor/generator speed and an actual engine speed.

2. The system of claim 1, wherein the power transfer unit is one of an automatic transmission, a planetary gear set, and an electronic converterless transmission.

3. The system of claim 1, wherein the vehicle system controller is further configured to determine the desired motor/generator speed and to calculate a speed error, the speed error being the difference between an actual motor/generator speed and the desired motor/generator speed.

4. The system of claim 3, wherein the vehicle system controller is further configured to command the disconnect clutch to close when the speed error is below a first calibratable tolerance.

5. The system of claim 3, wherein the vehicle system controller is configured to determine the desired motor/ generator speed based on vehicle speed at the beginning of engine starting and vehicle speed at some past time.

6. The system of claim 3, wherein the vehicle system controller is further configured to determine the desired motor/generator speed at least partly based on a vehicle accelerator position.

7. The system of claim 3, wherein the vehicle system controller is further configured to determine whether the motor/generator is in speed following control mode.

8. The system of claim 1, wherein the vehicle system controller is further configured to signal the engine to start fueling and to send a desired torque command to the engine when the slip speed error is below a second calibratable tolerance for a first calibratable time.

9. The system of claim 8, further comprising a second controller for calculating the desired torque command, the desired torque command being based on an actual motor/generator torque.

10. The system of claim 9, wherein the second controller is further configured to adjust the desired torque command based on the actual motor/generator torque.

11. The method of claim 9, wherein the desired motor/generator speed is an engine idle speed when a power transfer unit is not engaged, the power transfer unit being configured to transfer power from the engine and the motor/generator to vehicle wheels.

12. The method of claim 11, wherein the power transfer unit is one of an automatic transmission, a planetary gear set, and an electronic converterless transmission.

13. A method of starting an engine in a vehicle, the vehicle including a motor/generator, the method comprising:

operating the motor/generator based on a desired motor/generator speed;

calculating a speed error, the speed error being the difference between an actual motor/generator speed and the desired motor generator speed;

connecting the motor/generator directly to the engine to start engine rotation, the connecting of the motor/generator to the engine including closing a disconnect clutch when the speed error is below a first calibratable tolerance, the disconnect clutch being disposed between the engine and the motor/generator for connecting the engine to, and disconnecting the engine from, the motor/generator;

fueling the engine, thereby facilitating engine start; and sending a desired torque command to the engine.

14. The method of claim 13, wherein operating the motor/generator based on the desired motor/generator speed comprises determining the desired motor/generator speed and sending a speed command to the motor/generator.

15. The method of claim 13, wherein the desired motor/generator speed is based on vehicle speed at the beginning of engine starting and vehicle speed at some past time.

16. The method of claim 13, wherein the desired motor/generator speed is based on a vehicle accelerator position.

17. The method of claim 13, further comprising determining whether the vehicle is in speed following control mode.

18. The method of claim 13, further comprising calculating a slip speed error, the slip speed error being the difference between an actual motor/generator speed and an actual engine speed.

19. The method of claim 18, wherein the engine fueling is started and the desired torque command is sent to the engine when the slip speed error is below a second calibratable tolerance for a first calibratable time.

20. The method of claim 13, wherein the desired torque command is based on an actual motor/generator torque.

21. The method of claim 20, further comprising adjusting the desired torque command based on the actual motor/generator torque.

22. A method of starting an engine in a vehicle, the vehicle including a motor/generator, the method comprising:

entering an engine start mode;

operating the motor/generator based on a desired motor/generator speed;

connecting the motor/generator directly to the engine when a speed error is below a first calibratable tolerance, the speed error being the difference between an actual motor/generator speed and the desired motor/generator speed;

fueling the engine, thereby facilitating engine start, when a slip speed error is below a second calibratable tolerance for a first calibratable time, the slip speed error being the difference between the actual motor/generator speed and an actual engine speed; and sending a desired torque command to the engine when the slip speed error is below the second calibratable tolerance for the first calibratable time.

23. The method of claim 22, wherein operating the motor/generator based on the desired motor/generator speed comprises determining the desired motor/generator speed and sending a speed command to the motor/generator.

24. The method of claim 22, wherein connecting the motor/generator to the engine comprises closing a disconnect clutch, the disconnect clutch being disposed between the engine and the motor/generator for connecting the engine to, and disconnecting the engine from, the motor/generator.

25. The method of claim 22, wherein the desired motor/generator speed is based on vehicle speed at the beginning of engine starting and vehicle speed at some past time.

26. The method of claim 22, wherein the desired motor/generator speed is an engine idle speed when a power transfer unit is not engaged, the power transfer unit being configured to transfer power from the engine and the motor/generator to vehicle wheels.

27. The method of claim 26, wherein the power transfer unit is one of an automatic transmission, a planetary gear set, and an electronic converterless transmission.

28. The method of claim 27, wherein the desired torque command is based on an actual motor/generator torque.

29. The method of claim 28, further comprising adjusting the desired torque command based on the actual motor/generator torque.

30. The method of claim 29, further comprising exiting the engine start mode when the actual motor/generator torque has remained below a third calibratable tolerance for a second calibratable time, and the slip speed error has remained below a fourth calibratable tolerance for the second calibratable time.

31. The method of claim 22, further comprising exiting the engine start mode when a vehicle brake is applied.

32. A controller for starting an engine in a vehicle, the vehicle including a motor/generator, the controller comprising:

an algorithm for commanding the connection of the motor/generator to the engine while facilitating operation of the motor/generator based on a desired motor/generator speed, and for commanding fueling of the engine when a slip speed error is below a second calibratable tolerance for a first calibratable time, the slip speed error being the difference between an actual motor/generator speed and an actual engine speed.

* * * * *

UNITED STATES PATENT AND TRADEMARK OFFICE
CERTIFICATE OF CORRECTION

PATENT NO.    : 6,581,705 B2
DATED         : June 24, 2003
INVENTOR(S)   : Phillips et al.

It is certified that error appears in the above-identified patent and that said Letters Patent is hereby corrected as shown below:

Column 7,
Line 12, delete the word "the" before "*slip speed error*" and insert therein the word -- a --.
Line 21, delete the number of the claim "11." and insert therein the number -- 16. --.
Line 21, delete "claim 9", and insert therein -- claim 11 --.
Line 26, delete the number of the claim "12." and insert therein the number -- 17. --.
Line 26, delete "claim 11", and insert therein -- claim 16 --.
Line 29, delete the number of the claim "13." and insert therein the number -- 11. --.
Line 47, delete the number of the claim "14." and insert therein the number -- 12. --.
Line 47, delete "claim 13", and insert therein -- claim 11 --.
Line 51, delete the number of the claim "15." and insert therein the number -- 13. --.
Line 51, delete "claim 13", and insert therein -- claim 11 --.
Line 53, delete the number of the claim "16" and insert therein the number -- 14. --.
Line 53, delete "claim 13", and insert therein -- claim 11 --.
Line 55, delete the number of the claim "17." and insert therein the number -- 15. --.
Lines 55, 58 and 66, delete "claim 13", and insert therein -- claim 11 --.

Column 8,
Line 42, delete "claim 27", and insert therein -- claim 22 --.

Signed and Sealed this

Twenty-first Day of October, 2003

JAMES E. ROGAN
*Director of the United States Patent and Trademark Office*